(12) United States Patent  (10) Patent No.: US 9,231,844 B2
Tychon et al.  (45) Date of Patent: *Jan. 5, 2016

(54) AUTONOMOUS PERFORMANCE PROBING

(71) Applicant: Cisco Technology, Inc., San Jose, CA (US)

(72) Inventors: Emmanuel P. Tychon, Angleur (BE); L. Alexander Clemm, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/299,272

(22) Filed: Jun. 9, 2014

(65) Prior Publication Data

US 2014/0289405 A1   Sep. 25, 2014

Related U.S. Application Data

(63) Continuation of application No. 13/149,728, filed on May 31, 2011, now Pat. No. 8,751,619.

(51) Int. Cl.
*H04L 12/26* (2006.01)
*H04L 12/24* (2006.01)

(52) U.S. Cl.
CPC ............ *H04L 43/10* (2013.01); *H04L 41/5038* (2013.01); *H04L 43/026* (2013.01); *H04L 43/50* (2013.01); *Y02B 60/33* (2013.01)

(58) Field of Classification Search
CPC ... H04L 41/5038; H04L 43/026; H04L 43/10; H04L 43/50; Y02B 60/33
See application file for complete search history.

(56) References Cited

U.S. PATENT DOCUMENTS

| 6,505,244 | B1 | 1/2003 | Natarajan et al. |
| 6,684,336 | B1 | 1/2004 | Banks et al. |
| 7,409,677 | B1 | 8/2008 | Leventhal et al. |
| 7,680,928 | B2 | 3/2010 | Lean et al. |
| 7,881,221 | B2 | 2/2011 | Arad et al. |
| 7,987,264 | B1 | 7/2011 | Gill et al. |
| 8,194,565 | B2 | 6/2012 | Goodman |
| 8,352,998 | B1 | 1/2013 | Kougiouris et al. |
| 2002/0143914 | A1 | 10/2002 | Cihula |
| 2004/0022191 | A1 | 2/2004 | Bernet et al. |
| 2004/0267865 | A1 | 12/2004 | Cuervo |
| 2005/0210133 | A1 | 9/2005 | Florissi et al. |
| 2005/0257084 | A1 | 11/2005 | Fairhurst et al. |
| 2006/0209695 | A1 | 9/2006 | Archer et al. |
| 2008/0089241 | A1 | 4/2008 | Lloyd et al. |
| 2008/0316914 | A1 | 12/2008 | Vercellone et al. |
| 2010/0223287 | A1 | 9/2010 | Lim |
| 2012/0314573 | A1 | 12/2012 | Edwards et al. |

OTHER PUBLICATIONS

Kunysz, Adrien, "Design of a Peer to Peer System for Network Measurement", dated Aug. 2007, 50 pages.

*Primary Examiner* — Chirag R Patel
(74) *Attorney, Agent, or Firm* — Hickman Palermo Becker Bingham, LLP; Dominic Tsang (57) ABSTRACT

A method, device, and computer-readable medium are disclosed for automatically activating a probe configured to generate test network traffic in response to evaluating a policy that accounts for aggregated information that describes traffic that was processed by a network device. The method includes storing a policy, and evaluating the policy based at least in part on an item of received aggregated information that describes a set of packets that were processed by the network device and sent or received on a network. The probe is activated at least partially in response to evaluating the policy. The probe generates test packets to emulate one or more applications, services, or devices communicating on the network.

22 Claims, 7 Drawing Sheets

AUTONOMOUS PERFORMANCE PROBING

CROSS-REFERENCE TO RELATED APPLICATIONS; PRIORITY CLAIM

This application claims benefit as a Continuation of application Ser. No. 13/149,728, filed May 31, 2011, the entire contents of which are hereby incorporated by reference as if fully set forth herein, under 35 U.S.C. §120. The applicants hereby rescind any disclaimer of claim scope in the parent application or the prosecution history thereof and advise the USPTO that the claims in this application may be broader than any claim in the parent application.

This application is related to application Ser. No. 11/805,308, filed May 22, 2007, and application Ser. No. 12/505,861, filed Jul. 20, 2009, the entire contents of which are incorporated by reference herein in their entirety.

TECHNICAL FIELD

The present disclosure generally relates to controlling probes that generate test traffic based at least in part on information about other traffic that is processed by network devices.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Network devices such as routers and switches may process and forward network traffic according to configurable settings. The traffic may be transmitted from device to device on a network of the devices, often on behalf of applications communicating on the network. Individual items of traffic may be transmitted as packets along a route from a source application, service, or device to a destination application, service, or device.

Network administrators may configure network devices on the network such that the devices operate together to accomplish certain objectives. The objectives may include performance goals for applications, services, or devices using the network. For example, a network of devices may be configured to give priority to certain types of traffic, deter or prevent attacks against the network, save power, minimize latency, minimize the effects of applications, services, or devices that are overusing bandwidth, or meet levels of service that are guaranteed by a service provider under service agreements. In a particular example, the network administrator may guarantee levels of service for voice over Internet Protocol ("VoIP") applications or other business-critical applications so that application users can obtain the full benefit of the applications.

Passive monitoring may provide some information about production traffic on the network. However, due to privacy and security concerns, as well as legal issues stemming from those concerns, network administrators may be limited in terms of the amount of passive monitoring that can be performed on production traffic. Also, passive monitoring may not provide enough information when there is little or no relevant production traffic.

To determine whether network devices are meeting the demands of various applications, services, or devices, the network administrator may actively monitor the network by placing physical probes between devices in the network. The physical probes generate test traffic as if the test traffic was generated by particular applications, services, or devices using the network. The privacy and security concerns may be avoided by active monitoring because the generated test traffic is synthetic.

Some network devices are equipped with logic, in hardware, software, or a combination of hardware and software such as that provided on devices running Cisco IOS® Software, which allows the network administrator to use the network devices to create logical probes without adding any physical probes to the network. In a particular example, with Cisco IOS® Software an Internet Protocol Service Level Agreement (IPSLA) is a feature that allows network administrators to actively monitor and analyze IP service levels for IP applications and services.

The probes may generate the test traffic in a predictable manner even when the applications, services, or devices using the network are generating production traffic in an unpredictable manner. As a result of sending test traffic and receiving responses to the test traffic, active network monitoring provides a more detailed understanding of how the network is performing with respect to an application, service, or device.

Network administrators use probes sparingly so that the generated test traffic does not substantially slow down the network. If an application was not actively tested during a relevant period, a network administrator may not have enough information to troubleshoot how the network is handling the application. Alternately, the network administrator may not be able to confirm that the network is handling the particular application in accordance with existing service level agreements.

DETAILED DESCRIPTION

Autonomous performance probing is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Structural and Functional Overview
  2.1 Passive Network Traffic Monitoring
  2.2 Active Network Traffic Monitoring
  2.3 Active Monitoring based on Network Traffic Information
3.0 Autonomous Performance Probing
  3.1 Process of Evaluating Policies that Account for Network Traffic
  3.2 Process of Controlling Probes based on the Policies
  3.3 Process of Providing a Policy Management Interface
  3.4 Process of Providing a Probe Management Interface
4.0 Implementation Mechanisms—Hardware Overview
5.0 Extensions and Alternatives 1.0 General Overview Autonomous performance probing is described. In various embodiments, a method, device, and computer-readable medium are disclosed for automatically activating a probe configured to generate test network traffic in response to evaluating a policy that accounts for aggregated information that describes traffic that was processed by a network device. The method includes storing a policy, and evaluating the policy based at least in part on an item of received aggregated information that describes a set of packets that were processed by the network device and sent or received on a network. The probe is activated at least partially in response to evaluating the policy. The probe generates test packets to emulate one or more applications, services, or devices communicating on the network.

In one embodiment, a network device stores policies that account for information about flows of network traffic. The flow is defined by a set of packet characteristics, and the information describes a set of packets common to the flow that were processed by the network device. The network device also includes policy evaluating logic and a probe controller, each of which is embodied in specially configured hardware, specially configured software that operates on processors of the network device, or a combination of specially configured hardware and specially configured software that operates together on the network device.

The policy evaluating logic is configured to receive aggregated information that describes network traffic processed by the network device. The policy evaluating logic is further configured to automatically evaluate a stored policy that accounts for an item of the aggregated information. In one embodiment, the item of aggregated information relates to a flow of network traffic processed by the network device. The aggregated information may include, but is not limited to, a number of packets in the flow of network traffic, a number of bytes in packets of the flow of network traffic, a number of dropped packets in the flow of network traffic, a time between packets in the flow of network traffic, and/or a time range of packets in the flow of network traffic.

In various examples, characteristics common to packets in a flow may include, but are not limited to, a source address or set of source addresses, a destination address or set of destination addresses, a source port or set of source ports, a destination port or set of destination ports, an application-layer protocol or set of application-layer protocols, a type of service or set of types of service, and/or device interface or set of device interfaces.

In one embodiment, evaluating the policy results in the generation of scores for probes that are currently configured and activated and/or probes that could be configured and activated (but currently are not) to generate network traffic that is suited to measure certain service level parameters such as parameters associated with a particular application, a particular service, or a particular device. For example, a probe that emulates the particular application, the particular service, or the particular device could be configured and activated to generate test traffic. The test traffic is monitored to measure the performance of the particular application, the particular service, or the particular device on the network. In a particular example, a probe emulating an application that generates video traffic could be activated so that jitter can be measured for the test video traffic.

In one embodiment, information about different flows of network traffic may trigger different policies, which, when evaluated, generate or update a score for different probes. Scores of the different probes are ranked with respect to each other. In various embodiments, a single item of aggregated information for a single set of packets that were processed by a network device may contribute to scores of multiple probes; different items of aggregated information for a single set of packets processed by the network device may contribute differently to scores of multiple probes; multiple items of aggregated information for multiple sets of packets may contribute to a single score of a single probe; multiple items of aggregated information for multiple sets of packets may contribute to multiple scores of multiple probes. In a particular embodiment, a set of policies is re-evaluated when any new information is received about any set of packets processed by the network device, or after a specified period of time has passed in which information was received about any set of packets processed by the network device.

In one embodiment, a user such as a network administrator may customize, by providing user input to a policy management interface, a set of policies for automatically determining probe scores. In another embodiment, evaluating the policy includes determining that probe activation and/or de-activation conditions are satisfied, whether or not the conditions are based on scores. In this embodiment, a user may customize, by providing user input to a policy management interface, a set of conditions for determining which probes to automatically activate at a given time. The user may also customize threshold parameters such as how many probes may be active at any given time, or how many network resources active probes may consume, in absolute amounts or as a percentage of available resources. For example, the user may specify that probes with the top n probe scores are activated.

The probe controller is configured to automatically activate and/or de-activate probes that emulate one or more applications, services, or devices by generating test packets for the one or more applications, services, or devices. Similar applications, services, or devices may generate test traffic having similar packet characteristics. In one embodiment, a probe generates test traffic with packet characteristics that are common to a flow of network traffic that triggered activation of the probe. For example, a spike in traffic to a particular destination may trigger activation of a probe that generates test traffic for that destination. The test traffic may be monitored to determine if there are any problems with traffic being sent to the destination.

In one embodiment, the probe controller is configured to automatically activate or de-activate a probe in response to evaluation of the policy by the policy evaluating logic. In one embodiment, the policy evaluating logic receives information that describes network traffic, such as information about traffic in a particular flow, and evaluates a policy that accounts for the received information. In response to evaluation by the policy evaluating logic, the probe controller may be configured to automatically activate or de-activate a probe that is configured to generate test packets that emulate one or more applications, services, or devices using the network. In one embodiment, the generated test packets share characteristics that are common to the particular flow. In another embodiment, the probe controller may activate or de-activate a probe that is configured to generate test packets having characteristics that are not common to the particular flow, or having characteristics that are common to a flow other than the particular flow.

In one embodiment, the probe controller is constrained by policies that are generic with respect to flows of network traffic. For example, the probe controller may be constrained by a policy that sets a maximum, minimum, and/or preferred number of probes that may be activated, and/or a maximum, minimum, and/or preferred bandwidth that may be used by activated probes. In a particular example, these generic policies force the probe controller to de-activate one probe before activating another probe. In another example, the generic policies allow probes to be activated without de-activating other probes, or de-activated without activating other probes.

After policies are stored, the policies may be evaluated multiple times by the policy evaluating logic without requiring modification to the policies or any further user input. As a result of the multiple evaluations of the stored policies, scores are generated and re-generated, and probes are ranked and re-ranked. Updated scores or ranks cause the probe controller to activate and/or de-activate probes.

Various embodiments include one or more autonomous performance probing processes performed by a network device, one or more computer-readable media, such as non-transitory computer-readable media, configured to carry out an autonomous performance probing process, or a device configured with logic, such as policy evaluating logic and probe controlling logic, that, when used, carries out an autonomous performance probing process.

2.0 Structural and Functional Overview

Foundation concepts include those described in U.S. Pat. No. 6,308,148, "Network Flow Data Export," filed Dec. 20, 1996; U.S. Pat. No. 6,889,181, "Network Flow Switching and Flow Data Export," filed Jul. 2, 1997; U.S. Pat. No. 7,260,518, "Network Flow Switching and Flow Data Export," filed Aug. 23, 2004; U.S. Pat. No. 7,143,006, entitled "Policy-Based Approach For Managing The Export Of Network Flow Statistical Data," filed Mar. 23, 2005; U.S. application Ser. No. 11/805,308, "Processing Packet Flows," filed May 22, 2007; U.S. application Ser. No. 12/505,861, "Dynamic Probe Architecture," filed Jul. 20, 2009, the entire contents of which are incorporated by reference herein in its entirety. Familiarity with the cited patents and applications is assumed.

In various examples, devices are configured to automatically activate and de-activate probes for active traffic monitoring based on information collected from passive traffic monitoring. In one embodiment, a network device stores policies that account for information about monitored network traffic. The network device also includes policy evaluating logic and a probe controller. In another embodiment, a computer-readable storage medium stores instructions which, when executed, cause one or more processors to perform storing policies, evaluating the policies, and controlling probes. In yet another embodiment, a process performed by one or more computing devices includes storing policies, evaluating the policies, and controlling probes. Similar features can be implemented by a device configured with logic for performing a process, a method performed by one or more computing devices, or a medium that stores instructions for performing a process.

2.1 Passive Network Traffic Monitoring

Passive monitoring may provide some information about production traffic on the network. Such information includes performance associated with certain types of traffic, service levels associated with certain types of traffic, packet drops for certain types of traffic, volume of certain types of traffic, and delay for certain types of traffic.

In one embodiment, information collected by monitoring network traffic may be organized into items of aggregated information about network traffic that shares common characteristics. For example, various statistics may be monitored for traffic from various flows of network traffic. A flow of network traffic is network traffic that falls under the same flow definition. A flow definition defines a set of one or more packet characteristics which, when satisfied by a given packet of network traffic, qualify the given packet as within the flow. In one non-limiting example, a device configured with the Netflow feature of Cisco IOS® Software stores a flow record that includes key fields that define the flow and non-key fields that describe information to be collected and aggregated for the flow. In another non-limiting example, a device configured with Cisco Flexible Netflow logic allows a user, such as a network administrator, to configure which fields are used as key fields and which fields are used as non-key fields. Collecting information about production traffic is referred to herein as "passive network traffic monitoring."

Example fields that may be used by passive network traffic monitoring as key fields and/or non-key fields include, but are not limited to, IP source address, IP destination address, source port, destination port, protocol type, class of service, or router or switch interface. The source address and destination address provide information about who is originating or receiving network traffic. The source port, destination port, and protocol type provide information about applications contributing to the network traffic. The class of service provides information about the priority of the traffic. The router or switch interface provides information about how or from where the traffic enters the device. In addition to these examples, virtually any characteristic of a packet may be tracked using passive network traffic monitoring, including, for example, transport fields, routing fields or application-level fields.

In a particular example, an application-level message or header is extracted from packets using deep packet inspection. Fields from the application-level message or header are interpreted according to an application-level protocol that was used to send an application-layer message or header from a source application to a destination application. Flows and collected statistics may be based on the application-level information extracted from the application-layer messages.

A device configured to passively monitor network traffic may aggregate information about the amount of traffic in a flow, for example, by tallying packets or bytes in monitored flows, by calculating packets or bytes per second, or by calculating a total elapsed time of traffic in the flow. In addition to absolute types of aggregated information, the aggregated information for one flow may be compared to aggregated information for other flows to determine relative types of aggregated information. Information may be aggregated by the network device or by a device external to the network device.

2.2 Active Network Traffic Monitoring

To determine whether network devices are meeting the demands of various applications, services, or devices, the network administrator may actively monitor the network by placing probes that generate test traffic on the network. The probes may be physical probes hosted on devices separate from the network devices, or logical probes hosted on the network devices themselves. The probes generate test traffic as if the test traffic was generated by particular applications, services, or devices using the network. The test traffic is then observed and evaluated with respect to actual, measured service levels and performance characteristics, optionally compared to expected service levels and performance characteristics. In a particular example, an Internet Protocol Service Level Agreement (IPSLA) is a feature Cisco IOS® Software devices that allows network administrators to actively monitor and analyze IP service levels for IP applications and services.

The probes may generate the test traffic in a predictable manner even when the applications, services, or devices using the network are generating production traffic in an unpredictable manner. As a result of sending test traffic and receiving responses to the test traffic, the probes are able to evaluate performance of one or more applications, services, or devices by determining statistics that include, but are not limited to response times, one-way latency, jitter (inter-packet delay variance), packet loss, voice quality scores, packet ordering, network resource availability, path, application performance, download time, round-trip time, and/or server response time.

In one embodiment, the statistics are determined based on whether or not one or more expected responses were received in response to one or more generated test packets, or based on how frequently expected responses are received, or based on an amount of time between sending a test packet and receiving a response to the test packet. In another embodiment, the statistics are determined based on information received from a recipient of the test packets. For example, the recipient may report when the test packets were received, and when the test packets were responded to by the recipient, for determining statistics such as one-way latency. The statistics may be determined based on any manner of monitoring traversal of the test packets on the network. Traversal of the test packets may be monitored by the probe generating the test packets or by any other monitoring logic.

Probes generate test packets with configurable IP and application-layer characteristics, including, but not limited to source and destination IP address, port numbers, type of service byte (including DSCP and IP Prefix bits), virtual private network ("VPN") routing/forwarding instance ("VRF"), and web address. As used herein, a probe refers to a logical probe instance that generates test traffic that emulates one or more applications, services, or devices using the network. In one embodiment, a probe is associated with a flow of network traffic that relates to test traffic generated by the probe.

In one embodiment, probes actively monitor the network by enabling a responder in a destination device, configuring the characteristics to be used for the test traffic, generating test traffic that is sent from a source device to the destination device, receiving a response from the destination device, and determining active monitoring statistics based on the results of sending and receiving the response. In a particular example, four timestamps are taken: one when the source device sends information, one when the destination device receives information, one when the destination device sends a response, and one when the source device receives the response. The active monitoring statistics may be displayed to the user for various purposes, including, for example, for troubleshooting, problem analysis, designing network topologies, and verifying whether expected service levels, such as contractually agreed service levels, are met.

In various embodiments, the probes may be configured, activated, and de-activated using a command-line interface or using any other device management interface such as Simple Network Management Protocol (SNMP). A single network device may run multiple probes in communication with multiple other network devices.

A network administrator may guess at where to place the probes so that active monitoring provides the greatest expected value to the network administrator. The network administrator may manually choose to monitoring critical, performance-sensitive traffic, or to monitor traffic with known performance problems. However, manual probe placement requires human intervention to manually activate probes, and this manual component might not lead to a comprehensive or beneficial set of active performance measurements over time. On the other hand, liberal probe placement can degrade performance by using too many network resources, especially at critical times where network resources are scarce and active measurements are most valuable.

2.3 Active Monitoring Based on Network Traffic Information

According to various techniques described herein, probes for actively monitoring network traffic may be controlled based on collected network traffic information. The probes are activated or de-activated in response to detecting whether or not the monitored network traffic satisfies or does not satisfy a condition, pattern, or threshold. The monitored network traffic may include passively monitored production traffic and/or test traffic that is generated by existing probes and actively monitored. For example, information about a number of packets in a flow, a number of bytes in a flow, a number of dropped packets in a flow, a time between packets in a flow, or a time range of packets in a flow may be used to trigger activation or de-activation of a probe. In one embodiment, the activated or de-activated probe generates test traffic for a particular application, service, or device, that may or may not otherwise be using the network. In one embodiment, the activated or de-activated probe generates test traffic, at least some of which has characteristics that are common to a set of monitored packets that triggered activation of the probe. In another embodiment, at least some of the test traffic has characteristics that are not common to a set of monitored packets that triggered activation of the probe. For example, the probe may configured and activated to generate test traffic for a same application or application type, for a same service, for a same device, sent to a same destination, or sent to a different destination than monitored traffic that triggered activation of the probe.

Probes may be configured prior to activation or upon activation to generate test traffic that emulates one or more applications, services, or devices using the network. Activated probes actively generate test traffic according to the probe configurations. For example, the probes may generate test traffic periodically, at a specified rate, at random, or at other specified or non-specified times. Other network devices respond to the test traffic, and information in the responses may be used to determine response times, one-way latency, jitter, packet loss, voice quality scores, packet ordering, network resource availability, path, application performance, download time, round-trip time, and/or server response time. The information gathered from active monitoring may be used by a network administrator to judge the performance of the network with respect to the one or more applications, services, or devices emulated by the probe.

When de-activated, the probes stop generating test traffic. Optionally upon de-activation, a probe may be un-configured and space for storing configuration information for the probe may be de-allocated. Probes may be de-activated to reduce the bandwidth consumed for testing the network, to free up bandwidth for use by other probes to be activated, or to reduce or free up processor resources (CPU) or memory. A probe may be de-activated to free up resources on a device running the probe to generate test traffic, or to free up resources on a device receiving test traffic generated by the probe. A probe may also be de-activated when the probe's score drops, or when scores of other probes increase, such that the probe drops in ranking and is no longer one of the top ranked or most critical probes.

Probes may also be de-activated once a sufficient amount of information has been gathered, optionally based on the amount time a probe was activated or based on a quantity of information collected by the probe during a given time interval. In one embodiment, a probe is activated for a specified period of time, and the probe expires when the specified amount of time passes. Optionally, data collected by the probe may expire after a specified amount of time.

Figure 1:
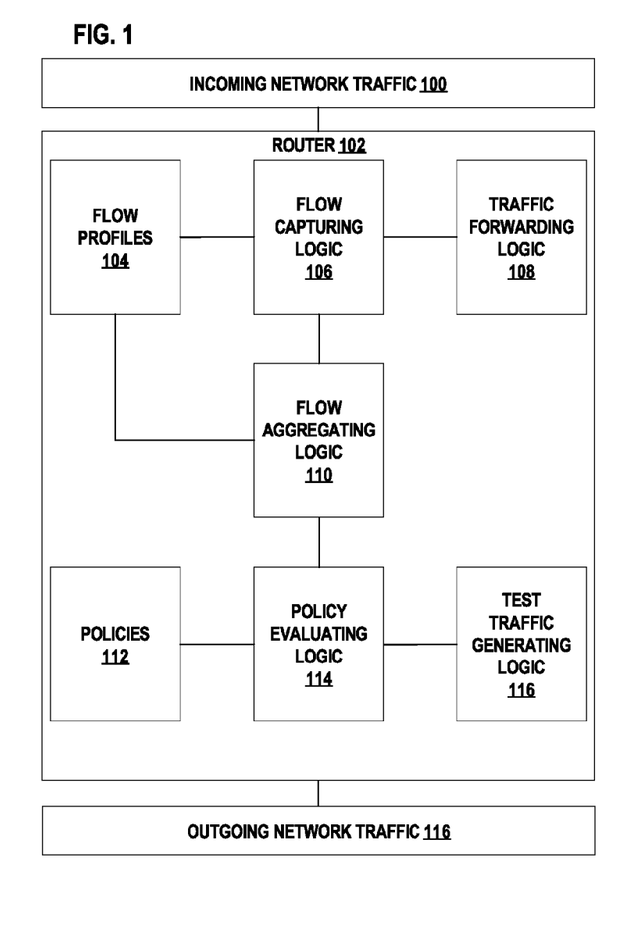
FIG. 1 illustrates an example network device configured with logic for automatically generating test traffic based on received information about network traffic.

FIG. 1 illustrates an example network device configured with logic for automatically generating test traffic based on received information about network traffic. In one embodiment, policies are evaluated to cause activation or de-activation of probes in response to receiving information about network traffic. In another embodiment, policies are evaluated asynchronously with receiving information about network traffic.

As illustrated in FIG. 1, incoming network traffic 100 is received at router 102. Router 102 includes traffic forwarding logic 108 for forwarding the traffic as outgoing network traffic 116. Router 102 also includes flow capturing logic 106 for capturing information about flows that are defined in flow profiles 104. For example, flow profiles 104 may define a flow of traffic as that traffic which shares a set of one or more common characteristics. The captured information is aggregated by flow aggregating logic 110. For example, a number of packets or bytes in the flow may be monitored, and statistics regarding the frequency of certain values in non-key fields of the flow may be computed.

Policy evaluating logic 114 receives aggregated information from flow aggregating logic 110. Policy evaluating logic 114 uses stored policies 112 to weigh probes based on the aggregated information. Probe weights may be determined for probes that are already configured ("configured probes"), probes that are actively generating test traffic ("active probes"), probes that have not yet been configured ("un-configured candidate probes"), and/or probes that are not yet actively generating test traffic ("configured candidate probes"). As an example, a stored policy accounts for an item of the aggregated information, and evaluation of the stored policy generates a score for a probe. The score may be used to determine whether or not the probe should be activated. Test traffic generating logic 116 receives information about the probes that results from evaluating the policies. In one example, test traffic generating logic 116 receives a score for each probe of a set of probes. Test traffic generating logic 116 selects a subset of probes based on the received information. In one example, the subset of n probes with the highest scores are selected for activation. Test traffic generating logic activates the selected probes and de-activates non-selected probes. Activated probes generate test traffic that emulates one or more applications, services, or devices communicating on the network.

Figure 2:
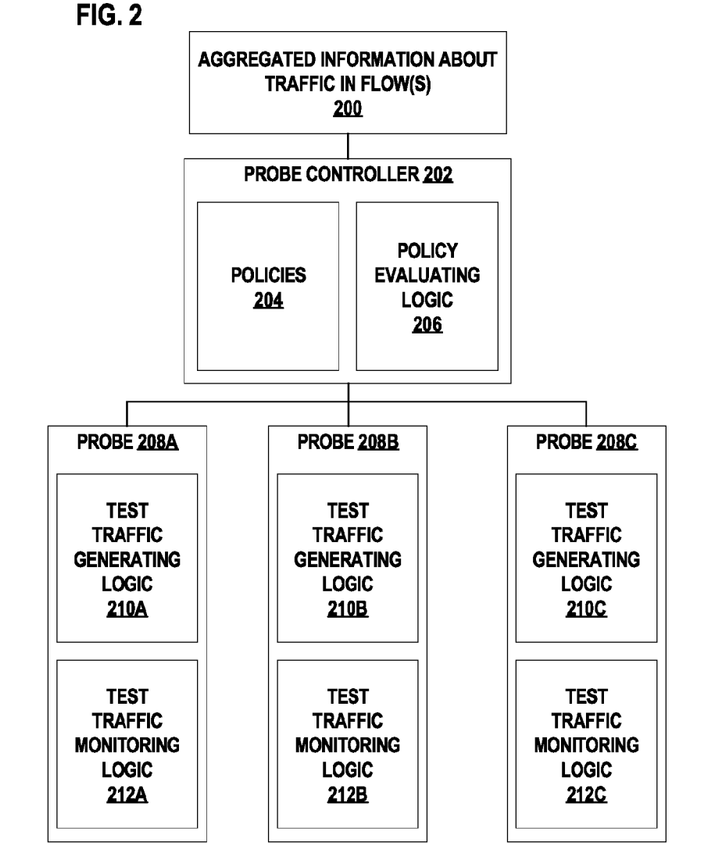
FIG. 2 illustrates an example probe controller configured with logic for automatically selecting probes to activate or de-activate based on to receiving information about network traffic.

FIG. 2 illustrates an example probe controller configured with logic for automatically selecting probes to activate or de-activate in response to receiving information about network traffic. As shown, aggregated information about traffic in one or more flows 200 is received by probe controller 202. Probe controller 202 includes policy evaluating logic 206 for evaluating stored policies 204 based on the received aggregated information 200.

In one embodiment, stored policies 204 may include conditions for determining when to activate particular probes of probes 208A-C. For example, the conditions may include comparisons of the received aggregated information 200 to threshold values. A probe associated with a satisfied condition may be activated, and a probe associated with a non-satisfied condition may be de-activated. In another embodiment, stored policies 204 may include score generating logic for scoring particular probes of probes 208A-C. A probe associated with a relatively high score may be activated, and a probe associated with a relatively low score may be de-activated.

As a result of evaluating the stored policies 204, probe controller 202 selects particular probes of probes 208A-C. As shown, there are only three probes from which to select. The actual number of probes available in a given implementation may alternatively be greater than three or fewer than three. The selected probes may be activated or de-activated, configured or un-configured. For example, a selected active probe with a relatively low score may be de-activated, and a selected inactive probe with a relatively high score may be activated. A probe may de-activated without being un-configured if the probe configuration information is stored after de-activation. Probes may be activated without de-activating other probes, or de-activated without activating other probes, such that the total number of active probes may vary at any given time.

3.0 Autonomous Performance Probing

Autonomous performance probing may include evaluating policies that account for network traffic and activating or de-activating probes in response to evaluating the policies. Alternately, autonomous performance probing may include triggering any type of active monitoring of network traffic based at least in part on passive monitoring of network traffic. Examples with varying degrees of breadth and detail are described herein for autonomous performance probing. Specific examples, while helpful to gain a more complete understanding of the subject matter disclosed, are not intended to limit the breadth of other examples, the breadth of the claims, or of the broad implications of this disclosure.

3.1 Process of Evaluating Policies that Account for Network Traffic

A set of policies may be stored on a non-transitory computer-readable medium such as memory or a mass storage device. Existing policies may be modified or deleted, and new policies may be added by users such as network administrators. When adding new policies, users may specify, via a policy management interface, what item(s) of aggregated information affect the policy output and how those item(s) of aggregated information affect the policy output. For example, each policy may be a function where the item(s) of aggregated information are dependent variable(s) and the policy output, such as a score, is the independent variable. As another example, a policy may be a set of conditions, the evaluation of which results in either triggering or not triggering activation of a probe.

In one embodiment, the policy is a logarithmic function of a value that represents the item of aggregated information, such as the number of packets or bytes that were observed in the flow over a given period of time. In various other embodiments, the function includes constant or variable multiples of the value that represents the item of aggregated information, constant or variable divisors of the value that represents the item of aggregated information, step functions for the value that represents the item of aggregated information, normalization functions for the value that represents the item of aggregated information, or other addition, subtraction, trigonometric, exponential, or other operators in combination with the one or more values that represent one or more items of aggregated information. In one example, a policy comprises a normalization function that allows different values of different types of aggregated information to contribute to scores in a uniform manner even though the different values have different scales or ranges.

Policies are evaluated using the received information. In one embodiment, the received information is information that was captured using passive network traffic monitoring, for example, by monitoring production traffic through the network device that controls the probes. In another embodiment, the received information is information that was captured using active network traffic monitoring, for example, by monitoring test traffic from the network device that controls the probes. In various embodiments, the received information provides aggregated values that account for a plurality of packets in a flow that were processed by a network device. For example, the received information may be aggregated by tallying packets or bytes in monitored flows, by calculating packets or bytes per second, or by calculating a total elapsed time of traffic in the flow.

In one embodiment, a network device includes policy evaluating logic configured to receive the aggregated information that describes network traffic processed by the network device. The policy evaluating logic is further configured to automatically evaluate one or more stored policies that account for an item of the aggregated information. The item of aggregated information relates to a flow of network traffic processed by the network device.

For example, a flow may be defined by a range of source addresses, and the item of aggregated information may be the number of packets or bytes of network traffic that has a source address within the range. As another example, the flow may be defined by a destination port, and the item of aggregated information may be the number of packets or bytes of network traffic per second that has the destination port. In this example, the policy evaluated using the item of aggregated information causes activation or de-activation of a probe that emulates an application, service, or device that uses the destination port for at least some of the generated test traffic.

In one embodiment, a policy accounts for an application type of the traffic, and different applications or application types may be assigned different priority scores. In one example, interactive video traffic (e.g., Cisco Telepresence traffic), gaming, voice, and real-time video traffic takes first, second, third, and fourth priority scores, whereas all other traffic might be a distant lower priority. For example, real-time video traffic may include video traffic that is transmitted using multiple unicast streams, one stream per viewer, or using multicast, where packets are duplicated by the network en route between the sender and the viewers. Application priorities might be assigned according to the configurable policies, with a reasonable set of defaults. For example, a policy could assign a score of 50 to interactive video, 10 to voice, and 1 to all other types of traffic.

In another embodiment, a policy accounts for the volume of traffic of a particular type of application to a given destination. The volume may be a function of the number of flows or the number of packets within flows. In one example, destinations which have more flows with a higher volume directed at them have a higher priority score over destinations with very little volume of application traffic. For example, to compute a score for a probe that generates test traffic, at least some of which is directed to a given destination, a score may be computed as the number of flows of the application type "video" to the destination, multiplied with the priority of "video" traffic, plus the number of flows with the application type "voice" to the destination, multiplied by the priority of "voice" traffic, plus the number of flows of all other types of traffic to the destination. In this example and others, different types of flow information may contribute in different ways to a score of a probe.

In various examples, policies may be configured to cause activation or increase scores for probes associated with the top n destinations for video traffic, for the top m destinations for voice traffic, and/or for top destinations for any other type of traffic. In a particular example, evaluation of one or more policies determines and activates the top n destinations for video traffic of primary importance. If any probe capacity is left, evaluation of the one or more policies determines and activates the top m destinations for voice traffic of primary importance. If any probe capacity is left, evaluation of the one or more policies determines and activates the top n+l to n+q destinations for video traffic, for q destinations of video traffic of secondary importance. If any probe capacity is left, evaluation of the one or more policies determines and activates the top m+l to m+r destinations for voice traffic, for r destinations of voice traffic of secondary importance. In one embodiment, additional probes may be determined using the intersection of sets of probes already determined. For example, probes may be determined from the top voice destinations that did not have video traffic or the top video destinations that did not have voice traffic. If any probe capacity remains, evaluation of the one or more policies may determine and activate the next top destinations of any type of traffic.

In various embodiments, policies may favor performance probing on highly trafficked sources or destinations, destinations identified by the user to be of high importance, types of traffic where service level agreements are being enforced, or traffic with high network-level or application-level priority. Network-level or application-level priority, or other collected information, may be obtained from network-level fields such as ToS or DSCP values, or application-level fields through deep packet inspection.

In yet another embodiment, a policy accounts for other flow characteristics. For example, the flow characteristics may indicate that a particular application is having trouble communicating on the network. Applications having trouble communicating on the network may be given a higher priority score than applications that are not having trouble. Indicators that an application may be having trouble communicating on the network may include, but are not limited to, packet drop counts, octet drop counts (standard IPFIX/NetFlow information elements), inter-packet arrival time variations (jitter), and loss rate.

Passive flow monitoring may provide information that can be used to identify, for example, top destinations, application types, top flows of a given application. The relevance of a particular probe may be a function of the type of traffic that is observed, the traffic volume that is observed, and any trouble indicators that are observed. A priority score for the probe is then assessed by a ranking of relevance of potential probes. For example, the top n probes are activated, with synchronous or asynchronous reassessments of the probe scores and synchronous or asynchronous changes in probe activation. In the example, scores could be reassessed every five minutes. In another example, the number of probes selected could be based on a percentage of the overall number of probes, or based on some other variable.

Policies may also account for information that is not specific to a flow of network traffic. In one embodiment, a policy accounts for how recently a probe has been activated, how much information a probe has gathered, or how long the probe has been activated. For example, a policy may reduce a score of a probe that has been recently activated, that has gathered a threshold amount of information over a recent period of time, or that has been active for a threshold amount of time. By accounting for probe usage over a period of time, the policies diversify the set of probes that are used during the period of time and therefore the probe measurements that are taken over the period of time.

In another embodiment, a policy accounts for overall bandwidth or load on the network device. For example, during peak times, the policy may reduce the maximum number of probes or the maximum amount of traffic generated by probes. For example, a policy may drive the autonomous performance probing system to avoid generating traffic during highly congested times, or to place further limits on the amount of probing that can be performed on when the device is loaded over a threshold amount. In one example, a policy may specify a bandwidth portion available for test traffic, and the bandwidth portion may vary based on the total amount of bandwidth currently consumed on the device. Data gathered by active performance probing may be even more useful during times of peak network usage, but a system that accounts for load conditions is able to balance this additional utility with the scarcity of available bandwidth during these peak times.

In one embodiment, different policies score different probes based on different items of information received from different flows of network traffic. In one embodiment, information from a given flow may be handled by a policy that accounts for information from the given flow, resulting in triggering activation or de-activation of a probe associated that generates traffic that shares characteristics common to the flow. In various embodiments, a single item of aggregated information for a single flow may contribute to scores of multiple probes. In one example, one or more policies receive information about traffic processed for a particular destination port, and output scores for each of two or more different probes. In a particular example, the different probes generate different test traffic that utilizes a same particular destination port.

In another example, multiple items of aggregated information for multiple flows may contribute to one or more scores of one or more probes. For example, one flow may be defined by packets having a particular destination address, and another flow may be defined by packets having a particular destination port. One or more policies receive information about the different flows and output scores for one or more probes.

After policies are stored, the policies may be evaluated multiple times by the policy evaluating logic without requiring modification to the policies or any further user input. For example, policy evaluation logic may receive a first set of aggregated information about a first set of packets, and, in response, trigger evaluation of a first set of policies. The policy evaluation logic may later receive a second set of aggregated information about a second set of packets, and, in response, trigger evaluation of the first set of policies. In some embodiments, receipt of the aggregated information immediately triggers evaluation of the policies or triggers evaluation of the policies after a specified delay. In another embodiment, the policy evaluation logic periodically evaluates policies asynchronously with receiving the information. As a result of the multiple evaluations of the stored policies, scores may be generated and re-generated, and probes may be ranked and re-ranked. Updated scores or ranks may cause the probe controller to activate and/or de-activate probes in a manner that is synchronous or asynchronous to policy evaluation.

In one embodiment, policy evaluations and probe placement determinations are made at a network management system ("NMS") that is separate from a network device performing the performance probing. In a particular embodiment, the NMS uses policies that account for network traffic information received from a plurality of network devices in the network. Evaluation of the policies by the NMS may cause multiple probes to be activated or de-activated on a single network device, or on multiple network devices.

Figure 4:
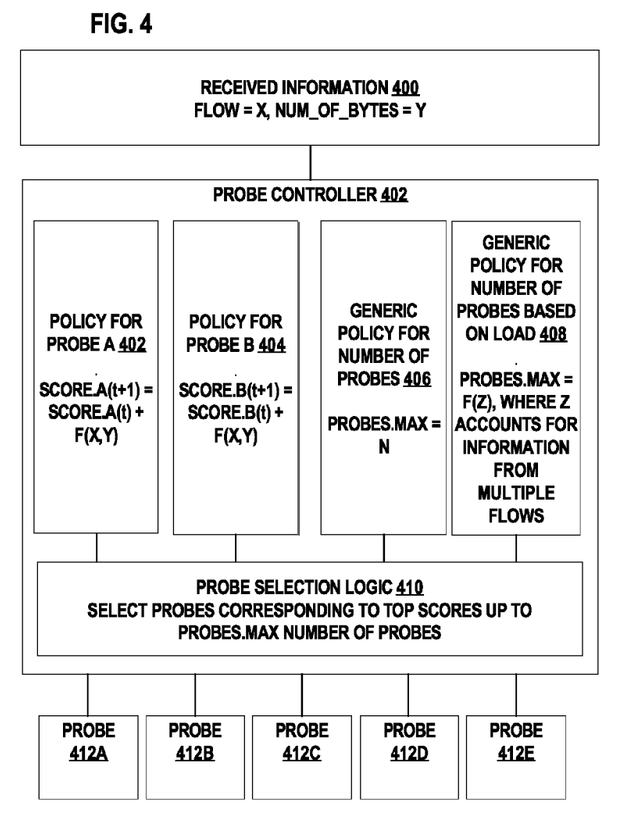
FIG. 4 illustrates an example probe controller storing example policies for automatically scoring probes.

FIG. 4 illustrates an example probe controller that uses example policies for automatically scoring probes. As shown, probe controller 402 receives information 400. The example information 400 provides a count of how many bytes are in a particular flow. The policies may also account for other received information. As shown, policy 402 for probe A specifies a scoring function of SCORE.A(t+1)=SCORE.A(t)+F(X,Y), which sets the score for a given probe to the current score plus a function of one or more observed flows and the number of bytes or some other packet characteristic such as number of packet drops. For example, the score may be a logarithmic function of the number of bytes processed for a particular flow. Policy 404 for probe B is also based on a function of the particular flow and the number of bytes.

Policies 406-408 include example generic policies that set the maximum number of probes that may be activated at any given time. As shown in policy 406, the maximum number of probes may be set to a static value, such as 10. As shown in policy 408, the maximum number of probes may be set to F(Z), where Z accounts for information from multiple flows. In other embodiments, the maximum or minimum number of probes may account for the current overall bandwidth usage, the time of day, or the percentage of the overall bandwidth currently being used for testing.

Probe selection logic 410 selects up to probes.max number of probes corresponding to the top scores. For example, probe selection logic 410 may select a subset of probes 412s for activation, and a subset of probes 412s for de-activation. In one embodiment, probes 412A, 412B, and 412C have the highest scores, and probes 412A and 412D are currently active with a maximum number of active probes set to 3. In one example, the probe controller 402 prevents frequent changes to the currently active probes by setting a threshold difference between a lowest score for an active probe and a highest score for an inactive probe. In one example, probe 412B is activated as having the second highest score. In the example, activation of probe 412C would require de-activation of probe 412D because the maximum number of probes is set to 3.

In one scenario, the difference between the scores of probes 412C and 412D does not meet a threshold for triggering de-activation of probe 412D and activation of probe 412C. In this example, probe 412A remains active, probe 412B is activated, and probe 412D also remains active. In another scenario, the difference between the scores of probes 412C and 412D does meet a threshold for triggering de-activation of probe 412D and activation of probe 412C. In this example, probe 412A remains active, probes 412B and 412C are activated, and probe 412D is de-activated.

Figure 5:
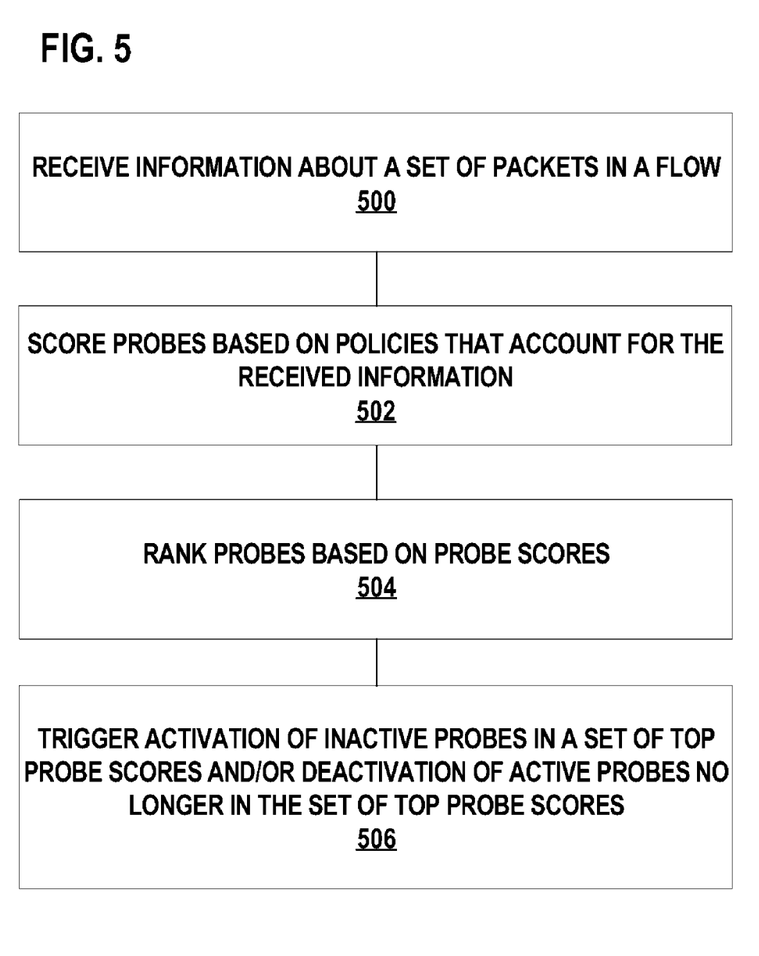
FIG. 5 illustrates an example process for automatically scoring probes in response to receiving information about network traffic.

FIG. 5 illustrates an example process for automatically scoring probes in response to receiving information about network traffic. In step 500, the process includes receiving information about a set of packets in a flow. Then, in step 502, probes are scored based on policies that account for the received information. In step 504, the probes are ranked based on the probe scores. As an alternative to steps 502 and 504, activation and/or de-activation of probes may be determined by a set of conditions that are either satisfied or not satisfied by the received information. In step 506, the process includes triggering activation of inactive probes in a set of top probe scores and/or deactivation of active probes no longer in the set of top probe scores.

3.2 Process of Controlling Probes Based on the Policies

The probe controller is configured activate and/or de-activate probes that generate test packets in a manner that emulates one or more applications, services, or devices communicating on the network. In particular, the probe controller is configured to automatically activate or de-activate a probe in response to evaluation of the policy by the policy evaluating logic. Activation or de-activation of the probe may be synchronous or asynchronous with policy evaluation. In one example, probe changes are made periodically in a manner that accounts for the results of policy evaluation. In another example, probe changes are triggered immediately or after a specified delay when the policy evaluation results in a significant re-ranking or re-scoring of the probes. For example, probe changes may be triggered whenever any probe score or rank changes, if an active probe score drops below a threshold score, if an inactive probe score increases beyond a threshold score, or if an inactive probe has a higher score than an active probe and the difference between the scores is above a threshold difference.

In one embodiment, policies are stored in association with probes and/or flows. For example, information from a given flow may trigger evaluation of only those policies that are associated with the flow. Similarly, evaluation of the policy may trigger activations or de-activations of only those probes associated with the policy. In another embodiment, the policy identifies a probe or group of probes, and score(s) to assign the probe(s). Alternately the policy identifies probe(s) to activate or de-activate without providing a score.

In another embodiment, policies are applied across all flows to compute scores for all potential candidate probes. The policies may be evaluated to compute probe scores synchronously or asynchronously with the receipt of network traffic information. For example, the policies may be evaluated in response to receiving updated network traffic information, or periodically. One policy may boost probe scores for top used applications, services, or devices, and another policy may boost probe scores for applications, services, or devices for which a service-level agreement is in place.

In one embodiment, the policy evaluating logic provides the probe controller with a probe identifier and a rank or score. In one embodiment, the probe identifier comprises a set of traffic-generation characteristics that define the probe. The probe controller uses the rank or score to manage which probes are activated or de-activated. In one example, a probe may be activated by merely causing the probe to start generating test traffic according to the set of traffic generation characteristics that define the probe.

In another example, a probe may be activated by creating the probe based on the set of traffic generation characteristics that define the probe, and also causing the probe to start generating test traffic according to the set of traffic generation characteristics. In this example, de-activating the probe may cause the probe to be destroyed, thereby freeing up memory on the network device. In yet another example, a probe may be activated by increasing the amount of test traffic generated by the probe above a threshold level even if the probe is already generating test traffic below the threshold level. In this example, the probe may be de-activated by decreasing the amount of test traffic generated by the probe below the threshold level even if the probe is still generating some test traffic.

Increasing or decreasing the amount of test traffic generated by an active probe may also be described as adjusting the probe's configuration rather than activating or de-activating the probe. In one embodiment, a probe's configuration may be adjusted to increase or decrease the amount of test traffic generated in response to evaluating the policies. In another embodiment, adjusting the configuration of a probe may include changing the type of test traffic generated by the probe, or changing a destination to which the probe sends the test traffic.

In one embodiment, the policy evaluating logic receives information that describes network traffic in a particular flow and evaluates a policy that accounts for the received information. In response to evaluation by the policy evaluating logic, the probe controller may be configured to automatically activate or de-activate a probe that is configured to generate test packets having characteristics common to the particular flow. For example, the activated or de-activated probe is configured to generate test traffic having characteristics common to the particular flow that triggered the policy evaluation. In another embodiment, the probe controller may activate or de-activate a probe that is configured to generate test packets having characteristics common to a flow other than the particular flow that triggered the policy evaluation.

In one embodiment, the probe controller is constrained by policies that are generic with respect to flows of network traffic. In one embodiment, the policies specify a maximum, a minimum, or a preferred number of probes that may be active. Enforcing a maximum forces the probe controller to select probes and weigh different probes against each other, for example by comparing probe scores. The probe controller may be constrained by a policy that sets a maximum, minimum, and/or preferred number of probes that may be activated, and/or a maximum, minimum, and/or preferred bandwidth that may be used by activated probes. In a particular example, these generic policies may force the probe controller to de-activate one probe before activating another probe.

In one embodiment, the probe controller maintains a number of active probes that is below the permissible maximum number of probes. For example, evaluation of one or more policies may generate scores for ranking the top n candidate probes. A probe in the top n candidate probes may be affected by another policy that requires the probe's score to be above a threshold, specified in the other policy, in order for the probe to be activated. Accordingly, one or more probes may be excluded from activation at any given time due to such policies.

In another embodiment, a preferred number of active probes, a minimum number of active probes, and/or a maximum number of active probes may vary depending on an overall CPU, memory, and network load. In order to avoid overloading the system during times of high loads, the permissible number of active probes may be lower during times of high loads than in times of low loads.

In another embodiment, the number of active probes allowed depends on the magnitude and effect of test traffic generated by the activated probes. For example, if a particular two probes generate more test traffic than four other probes, then the number of active probes allowed may be limited to two when the particular two probes are activated, but increased to four when the other probes, but not the particular two probes, are activated. A determination of whether to activate or de-activate a probe may be controlled, in part, based on the amount of load the probe creates for the system, whether the load is a load on the CPU, the memory, or the network.

Scores may be automatically generated and re-generated, and probes may be automatically ranked and re-ranked based on stored policies without requiring any input from the user. Updated scores or ranks may cause the probe controller to automatically activate and/or de-activate probes without requiring the user to select or even confirm the activated or de-activated probes. In this manner, once the policies are stored, the system performs active monitoring in a manner that changes based on patterns of network traffic, and without requiring the user to manually change which probes are activated or de-activated. Recent information from active monitoring may be available to the user when requested even though the user did not initiate the instance of active monitoring or probe that caused the recent information to be collected.

Figure 3:
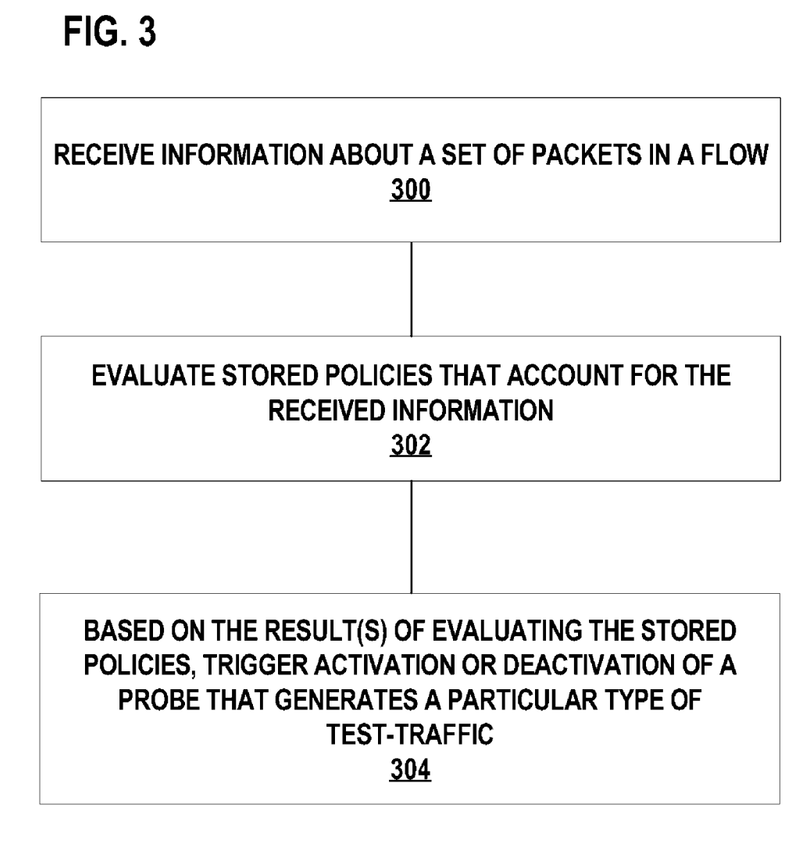
FIG. 3 illustrates an example process for automatically triggering activation or de-activation of a probe based on received information about network traffic.

FIG. 3 illustrates an example process for automatically triggering activation or de-activation of a probe in response to receiving information about network traffic. In step 300, the process includes receiving information about a set of packets in a flow. Next, the process evaluates stored policies that account for the received information in step 302. In step 304, based on one or more results of evaluating the stored policies, the process triggers activation or de-activation of a probe that generates a particular type of test traffic. For example, the process may trigger activation or de-activation of a probe associated with the policy that accounts for the flow of network traffic.

3.3 Process of Providing a Policy Management Interface

A user such as a network administrator may store and update, by providing user input to a policy management interface, a set of policies for automatically determining probe scores. In another embodiment, a user may store and update policies by providing, via the policy management interface, a set of conditions for automatically determining which probes to activate at a given time. Stored policies may be modified at any time, and the network device may operate to perform autonomous performance probing without receiving any further input from the user after the user has defined policies. In one embodiment, a set of default policies are provided, and the user does not need to provide any user input with respect to performance probing before the network device begins performing autonomous performance probing.

Figure 6:
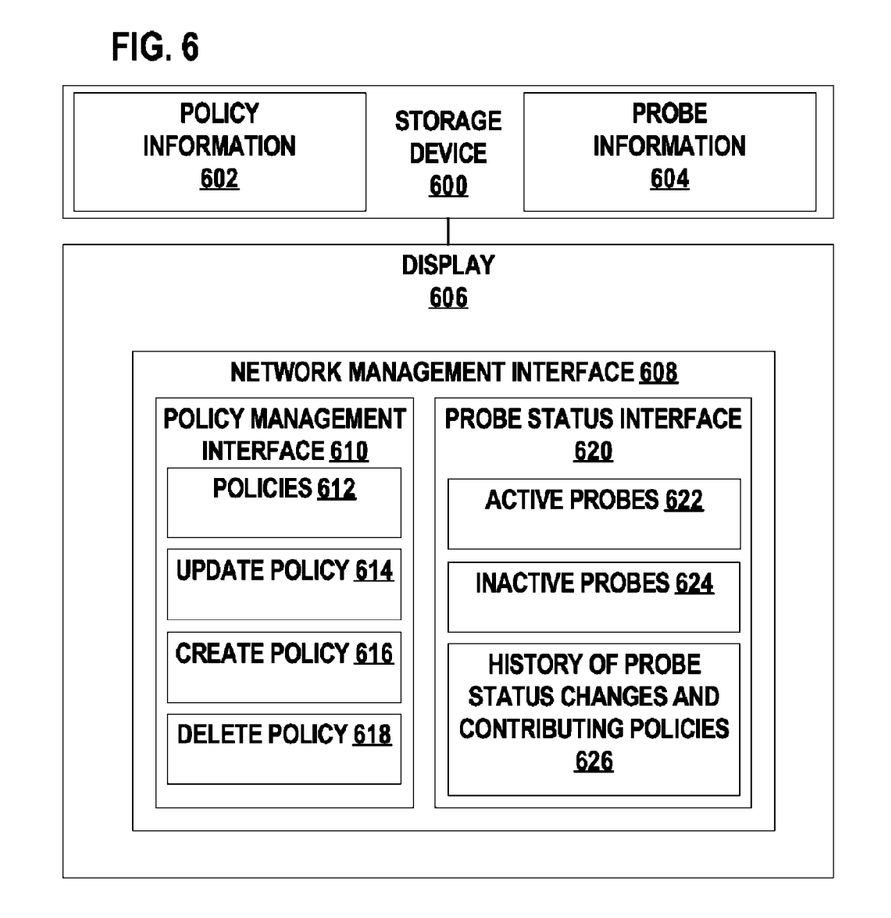
FIG. 6 illustrates an example interface for managing policies and viewing probe statuses.

FIG. 6 illustrates an example interface for managing policies. As illustrated, storage device 600 stores policy information 602. In one embodiment, storage device 600 is part of a network device performing autonomous performance probing. In another embodiment, storage device 600 is separate from a network device performing autonomous performance probing. Information from storage device 600 is displayed on display 606 via a network management interface 608. In the illustrated example, policy management interface 610 displays policies 612 as well as controls for managing policies 614-618. The controls include the update policy control 614, create policy control 616, and delete policy control 618. The user may utilize the policy management interface to customize policy information 602 that is stored on storage device 600.

3.4 Process of Providing a Probe Management Interface

Although the techniques provided herein provide techniques for automatically activating and de-activating probes, probes may also be manually activated or de-activated according to particular embodiments. An interface may be provided to the user for managing active and inactive probes. In this manner, the user may not only see which probes have been automatically being activated or de-activated at any given time, but the user may intervene to override automatic activations or de-activations.

FIG. 6 illustrates an example interface for viewing probe statuses. As shown, storage device 600 stores probe information 604. Display 606 displays probe information 604 via probe status interface 620. Probe status information provides information about active probes 622, inactive probes 624, and a history of probe status changes and contributing policies 626. For example, whenever a probe status changes from active to inactive or from inactive to active, an item may be generated in history 626 that describes which policies caused the probe status to change. In a particular example, a policy contributing to a change in a score for the probe may be displayed in addition to the change in the probe status. In an embodiment not shown, additional controls may be provided to manually override the automatic probe activations or de-activations. For example, a control next to each probe may allow the probe to be manually activated or manually de-activated. The manual override may be effective for a certain period of time that is specified by the user, or for an indefinite period of time.

4.0 Implementation Mechanisms—Hardware Overview

Figure 7:
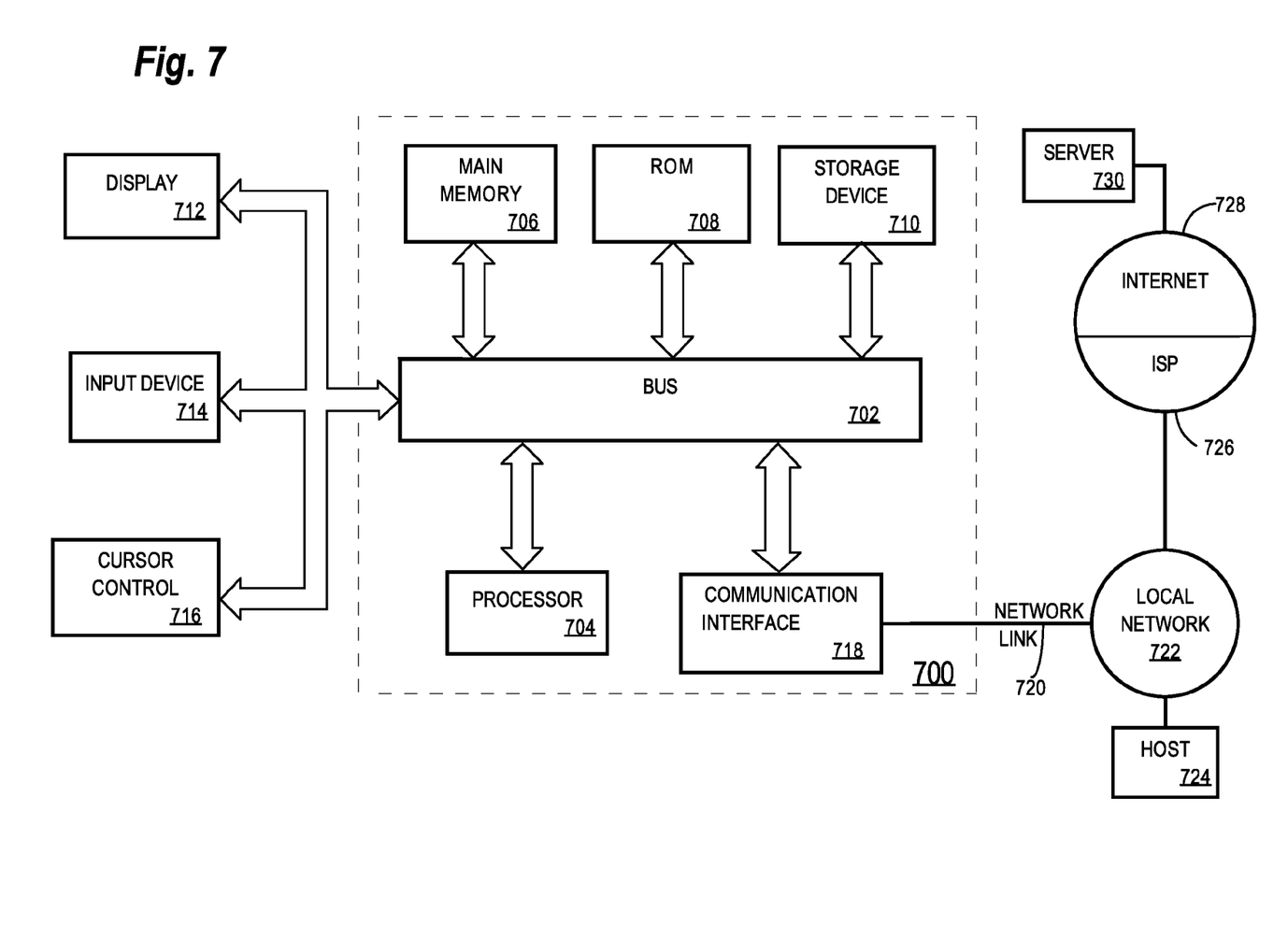
FIG. 7 illustrates a computer system upon which an embodiment may be implemented.

FIG. 7 is a block diagram that illustrates a computer system 700 upon which an embodiment of the invention may be implemented. One embodiment is implemented using one or more computer programs running on a network element such as a router device. Thus, in this embodiment, the computer system 700 is a router.

Computer system 700 includes a bus 702 or other communication mechanism for communicating information, and a processor 704 coupled with bus 702 for processing information. Computer system 700 also includes a main memory 706, such as a random access memory (RAM), flash memory, or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk, flash memory or optical disk, is provided and coupled to bus 702 for storing information and instructions.

A communication interface 718 may be coupled to bus 702 for communicating information and command selections to processor 704. Interface 718 is a conventional serial interface such as an RS-232 or RS-422 interface. An external terminal 712 or other computer system connects to the computer system 700 and provides commands to it using the interface 718. Firmware or software running in the computer system 700 provides a terminal interface or character-based command interface so that external commands can be given to the computer system.

A switching system 716 is coupled to bus 702 and has an input interface 714 and an output interface 719 to one or more external network elements. The external network elements may include a local network 722 coupled to one or more hosts 724, or a global network such as Internet 728 having one or more servers 730. The switching system 716 switches information traffic arriving on input interface 714 to output interface 719 according to pre-determined protocols and conventions that are well known. For example, switching system 716, in cooperation with processor 704, can determine a destination of a packet of data arriving on input interface 714 and send it to the correct destination using output interface

719. The destinations may include host 724, server 730, other end stations, or other routing and switching devices in local network 722 or Internet 728.

The invention is related to the use of a computer system, such as computer system 700, for autonomous performance probing. According to one embodiment, autonomous performance probing is provided by computer system 700 in response to processor 704 executing one or more sequences of one or more instructions contained in main memory 706. Such instructions may be read into main memory 706 from another non-transitory computer-readable storage medium, such as storage device 710. Execution of the sequences of instructions contained in main memory 706 causes processor 704 to perform the process steps described herein. One or more processors in a multi-processing arrangement may also be employed to execute the sequences of instructions contained in main memory 706. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any non-transitory storage medium that participates in providing instructions to processor 704 for execution. Such a medium may take many forms, including but not limited to, non-volatile storage media and volatile storage media. Non-volatile storage media includes, for example, optical or magnetic disks, such as storage device 710. Volatile storage media includes dynamic memory, such as main memory 706.

Common forms of computer-readable storage media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, memory stick or thumb drive, any other memory chip or cartridge, or any other non-transitory storage medium from which a computer can read. In various embodiments, multiple computer-readable storage media may operate together as a cloud storage system. A set of instructions may be distributed among the multiple computer-readable storage media in a manner that is transparent to an end-user of the cloud storage system.

Various forms of computer readable storage media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line, DSL line, cable line, or fiber optic line using a modem or broadband adapter, gateway, or interface. A modem local to computer system 700 can receive the data on the line and use an infrared transmitter to convert the data to an infrared signal. An infrared detector coupled to bus 702 can receive the data carried in the infrared signal and place the data on bus 702. Bus 702 carries the data to main memory 706, from which processor 704 retrieves and executes the instructions. The instructions received by main memory 706 may optionally be stored on storage device 710 either before or after execution by processor 704.

Communication interface 718 also provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. One such downloaded application provides for autonomous performance probing as described herein.

The received code may be executed by processor 704 as it is received, and/or stored in storage device 710, or other non-volatile storage for later execution.

5.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A network device comprising:
one or more processors;
a probe controller coupled to the one or more processors and configured to:
determine a plurality of scores for a plurality of probes, each of which is configured to generate one or more test packets that emulate one or more applications, services, or devices that correspond to said each probe,
determine a ranking of the plurality of probes based on the plurality of scores, each of which is associated with a different probe of the plurality of probes,
automatically activate or deactivate a probe of the plurality of probes based on the ranking.

2. The network device of claim 1, wherein:
the plurality of scores includes a score for the probe;
prior to determining the score, the probe is an inactive probe that is not in a set of top probe scores;
after determining the score, the probe is in the set of top probe scores;
the probe controller is configured to automatically activate the probe based on the ranking.

3. The network device of claim 1, wherein:
prior to determining the score, the probe is an active probe that is in a set of top probe scores;
after determining the score, the probe is not in the set of top probe scores;
the probe controller is configured to automatically deactivate the probe based on the ranking.

4. The network device of claim 1, wherein the plurality of scores for the plurality of probes is based on a volume of traffic of a plurality of destinations, each of which is associated with a different probe of the plurality of probes.

5. The network device of claim 1, wherein the plurality of scores for the plurality of probes is based on a priority of different types of traffic, each of which is associated with a different probe of the plurality of probes.

6. The network device of claim 1, further comprising:
monitoring logic monitoring performance of one or more second applications, services, or devices based on information about one or more test packets generated by a particular probe of the plurality of probes.

7. The network device of claim 1, further comprising:
a storage device coupled to the one or more processors and configured to store a first policy;
policy evaluating logic coupled to the one or more processors, the policy evaluating logic configured to:
receive first aggregated information that describes a set of packets that was processed by the network device,
evaluate the first policy based at least in part on a first item of the first aggregated information.

8. The network device of claim 7, wherein:
the probe is a first probe;
the policy evaluating logic is configured to determine, based at least in part on evaluating the first policy based on the first item of the first aggregated information, a first score for the first probe;
the policy evaluating logic is configured to:
determine, based at least in part on evaluating the first policy based on the first item of the first aggregated information, the plurality of scores,
evaluate the first policy based at least in part on a second item of the first aggregated information that is different than the first item, and determine, based at least in part on evaluating the first policy based on the second item of the first aggregated information, a second score for a second probe that is different than the first probe, or
evaluate, based at least in part on a third item of second aggregated information, a second policy that is different than the first policy, and determine, based at least in part on evaluating the second policy based on the third item of the second aggregated information, a third score for a third probe that is different than the first probe.

9. The network device of claim 7, wherein the set of packets belongs to a flow that is defined by one or more particular packet characteristics, which include one or more of a source address or set of source addresses, a destination address or set of destination addresses, a source port or set of source ports, a destination port or set of destination ports, an application-layer protocol or set of application-layer protocols, a type of service or set of types of service, or device interface or set of device interfaces.

10. The network device of claim 7, wherein the first aggregated information includes one or more of a number of packets in the set of packets, a number of bytes in the set of packets, a number of dropped packets, a time between packets in the set of packets, or a time range of the set of packets.

11. The network device of claim 7, further comprising:
a policy interface coupled to the one or more processors and configured to receive input that defines the first policy;
wherein the policy evaluating logic is configured to perform, without modifying the first policy, both a first evaluation of the first policy using the first item of the first aggregated information from a first set of one or more packets, and a second evaluation of the first policy using a second item of aggregated information from a second set of one or more packets; and
wherein the probe controller is configured to automatically activate or deactivate one or more probes in response to each of the first evaluation and the second evaluation of the first policy without modifying the first policy.

12. A method comprising:
determining a plurality of scores for a plurality of probes, each of which is configured to generate one or more test packets that emulate one or more applications, services, or devices that correspond to said each probe;
determining a ranking of the plurality of probes based on the plurality of scores, each of which is associated with a different probe of the plurality of probes;
automatically activating or deactivating a probe of the plurality of probes based on the ranking;
wherein the method is performed by one or more computing devices.

13. The method of claim 12, wherein:
the plurality of scores includes a score for the probe;
prior to determining the score, the probe is an inactive probe that is not in a set of top probe scores;
after determining the score, the probe is in the set of top probe scores;
automatically activating or deactivating comprises automatically activating the probe based on the ranking.

14. The method of claim 12, wherein:
prior to determining the score, the probe is an active probe that is in a set of top probe scores;
after determining the score, the probe is not in the set of top probe scores;
automatically activating or deactivating comprises automatically deactivating the probe based on the ranking.

15. The method of claim 12, wherein the plurality of scores for the plurality of probes is based on a volume of traffic of a plurality of destinations, each of which is associated with a different probe of the plurality of probes.

16. The method of claim 12, wherein the plurality of scores for the plurality of probes is based on a priority of different types of traffic, each of which is associated with a different probe of the plurality of probes.

17. The method of claim 12, further comprising:
monitoring performance of one or more second applications, services, or devices based on information about one or more test packets generated by a particular probe of the plurality of probes.

18. The method of claim 12, further comprising:
storing a first policy;
receiving first aggregated information that describes a set of packets,
evaluating the first policy based at least in part on a first item of the first aggregated information.

19. The method of claim 18, wherein:
the probe is a first probe;
the method further comprising determining, based at least in part on evaluating the first policy based on the first item of the first aggregated information, a first score for the first probe;

the method further comprising:
  determining, based at least in part on evaluating the first policy based on the first item of the first aggregated information, the plurality of scores,
  evaluating the first policy based at least in part on a second item of the first aggregated information that is different than the first item, and determining, based at least in part on evaluating the first policy based on the second item of the first aggregated information, a second score for a second probe that is different than the first probe, or
  evaluating, based at least in part on a third item of second aggregated information, a second policy that is different than the first policy, and determining, based at least in part on evaluating the second policy based on the third item of the second aggregated information, a third score for a third probe that is different than the first probe.

20. The method of claim 18, wherein the set of packets belongs to a flow that is defined by one or more particular packet characteristics, which include one or more of a source address or set of source addresses, a destination address or set of destination addresses, a source port or set of source ports, a destination port or set of destination ports, an application-layer protocol or set of application-layer protocols, a type of service or set of types of service, or device interface or set of device interfaces.

21. The method of claim 18, wherein the first aggregated information includes one or more of a number of packets in the set of packets, a number of bytes in the set of packets, a number of dropped packets, a time between packets in the set of packets, or a time range of the set of packets.

22. The method of claim 18, further comprising:
  receive input that defines the first policy;
  performing, without modifying the first policy, both a first evaluation of the first policy using the first item of the first aggregated information from a first set of one or more packets, and a second evaluation of the first policy using a second item of aggregated information from a second set of one or more packets; and
  automatically activating or deactivating one or more probes in response to each of the first evaluation and the second evaluation of the first policy without modifying the first policy.

\* \* \* \* \*